Feb. 1, 1938.  G. E. WHITE  2,106,822
FLUID SUPPLY SYSTEM
Filed Sept. 23, 1936
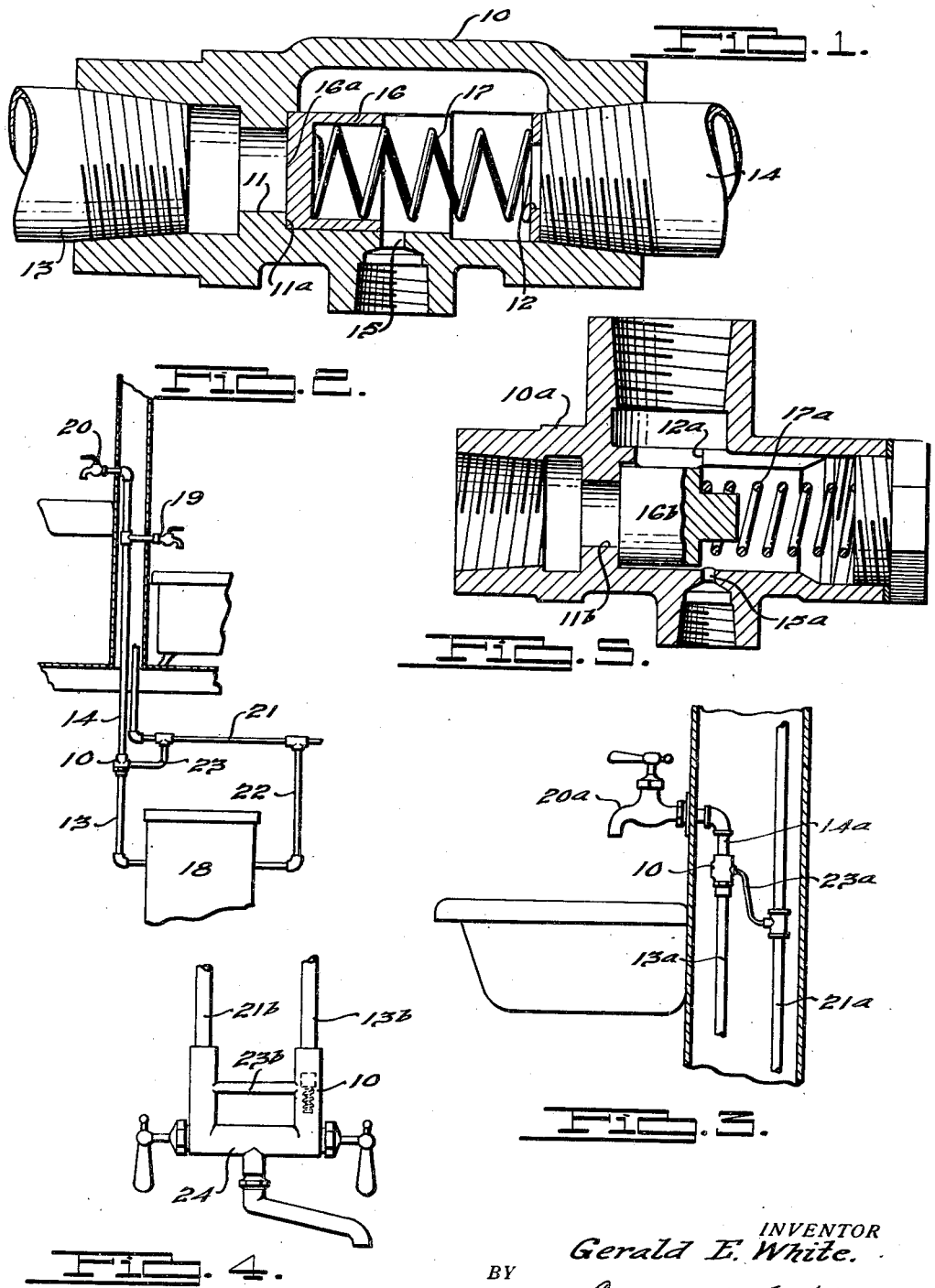
INVENTOR
Gerald E. White.
BY
Carroll R. Taber
ATTORNEY Patented Feb. 1, 1938

2,106,822

UNITED STATES PATENT OFFICE 2,106,822

FLUID SUPPLY SYSTEM

Gerald E. White, Lansing, Mich.

Application September 23, 1936, Serial No. 102,078

6 Claims. (Cl. 137—78)

This invention relates to fluid supply systems such as a household water supply system and more particularly to the combination therewith of a novel form of drip valve. The principal object of the invention is the provision of means for preventing the loss of hot water in such a system, due to leaky faucets.

This object is attained by providing a drip valve which supplies cold water to leaky faucets instead of hot water and which does not dilute the hot water withdrawn from the faucet when the faucet is appreciably opened. In other words, cold water is supplied to the hot water faucet only so long as the faucet is substantially closed and hot water is supplied to the faucet, without being diluted by cold water, when the faucet is appreciably opened.

Illustrative embodiments of the invention are shown in the accompanying drawing wherein:

Fig. 1 is a sectional view of a preferred form of drip valve;

Figs. 2, 3, and 4 illustrate, somewhat diagrammatically, various applications of the drip valve of Fig. 1 to a household water supply system; and Fig. 5 is a sectional view of a modified form of drip valve.

The valve illustrated in Fig. 1 comprises a hollow tubular casing 10, having large inlet and outlet openings 11 and 12 in its opposite ends and a small auxiliary inlet opening 15 in its side. The openings 11 and 12 are of substantially the same size and the opening 15 is materially smaller than openings 11 and 12. The casing is tapped adjacent each of the openings 11, 12 and 15 to receive pipe connections of appropriate size. Supply pipe section 13 is shown as connected to the casing 10 adjacent inlet opening 11. Supply pipe section 14 is shown connected to the casing adjacent outlet opening 12.

The interior of the casing 10 is formed to provide a valve seat 11a around the opening 11 and to slidably receive a piston valve 16. The piston has a head 16a adapted for engagement with seat 11a, whereby to close opening 11, as shown.

A coiled compression spring 17 is positioned between the outlet end of casing 10 and piston 16 to resiliently urge the piston toward opening 11.

The shape of piston 16 and the relative position of openings 11 and 15 are such that when the piston is moved away from opening 11 its cylindrical side wall closes opening 15. Thus the piston 16 is adapted to be moved to alternately close openings 11 and 15.

When the piston is in position to close opening 11, an unrestricted passageway is provided between openings 15 and 12. When the piston is in position to close opening 15, a substantially unrestricted passageway is provided between openings 11 and 12.

The effective strength of spring 17 is such that it will hold piston 16 in position to close opening 11 only so long as the fluid pressure on both sides of the piston is substantially equal. When the pressure against the head of the piston appreciably exceeds that against the opposite side thereof, spring 17 is compressed and the piston moves to a position closing opening 15. When the pressure is again equalized, spring 17 forces piston 16 back in position to close opening 11 and to free opening 15.

The operation of the valve can best be described in connection with its use in a conventional household water supply system such as that illustrated in Fig. 2. As there shown, pipe sections 13 and 14 comprise a hot water supply line. Section 13 has one end connected to the hot water heater 18 and the other end connected to valve casing 10 adjacent inlet opening 11. Section 14 has one end connected to valve casing 10 adjacent outlet opening 12 and is provided at its other end with shut-off valves or faucets 19 and 20.

A cold water supply pipe is shown at 21 connected to any suitable source of supply under pressure. Cold water is supplied to the hot water heater 18 from pipe 21 through connection 22. Cold water is supplied to the auxiliary inlet opening 15 in valve casing 10 through the connection 23, which is of reduced section.

From the foregoing hook-up, it will be apparent that hot water may be withdrawn from faucets 19 and 20 only after it has passed through valve casing 10 and that cold water may also pass through casing 10 and be discharged at faucets 19 and 20. The purpose of this hook-up is to prevent the loss of hot water due to leaks in faucets 19 and 20 and to supply cold water for such leaks without diluting the hot water which is withdrawn from the faucets when they are intentionally opened for that purpose.

As previously stated, spring 17 holds piston 16 in position to close opening 11 so long as the pressure on both sides of the piston is equal. When faucets 19 and 20 are closed after the withdrawal of hot water, the pipe sections 13 and 14 and the casing 10 are all full of hot water. The pressure on both sides of piston 16 is therefore equal and spring 17 holds piston 16 in position to close opening 11.

When piston 16 is in position to close opening 11, there is an unrestricted passageway between opening 15 and opening 12. Therefore, any water lost from casing 10 or pipe 14 by leakage through the faucets 19 and 20 is immediately replaced by cold water admitted through inlet opening 15.

When either of the faucets is appreciably opened, water is withdrawn from casing 10 and pipe section 14 faster than cold water is admitted through the small opening 15, resulting in a sufficient reduction in pressure on the outlet side of piston 16 to cause the piston to move away from opening 11 and to close opening 15. Thereafter, so long as the faucet is held open, hot water flows through the casing 10 and the cold water supply is positively stopped. Piston 16 is actuated to again close opening 11 as soon as the faucet is closed.

Thus it will be seen that the drip valve serves to prevent loss of hot water by leakage while avoiding dilution of the hot water when the hot water faucets are appreciably opened. Of course to accomplish this desirable result it is essential that opening 15 be substantially smaller than openings 11 and 12 and that spring 17 be strong enough to hold piston against seat 11a only so long as the pressure on both sides of the piston is substantially equal. Likewise, the effective openings of faucets 19 and 20 must be larger than the opening 15.

In Fig. 3, there is illustrated a slightly different arrangement of the valve casing 10 with respect to the water supply system. Here the drip valve is located in the hot water pipe 13a adjacent the hot water faucet 20a. Cold water is supplied to opening 15 from the cold water pipe 21a through the connection 23a.

In Fig. 4, the drip valve is shown as built into a combination hot and cold water faucet 24 to which hot water is supplied by pipe 13b and cold water by pipe 21b. Cross connection 23b supplies cold water to the opening 15 in valve 10 which is built into the hot water side of the faucet.

Regardless of the manner in which the drip valve is applied to the water supply system, its operation is as described above. Some advantage is obtained by locating the valve close to the faucet as then no portion of the hot water pipe becomes filled with cold water as might be the case when the hook-up of Fig. 2 is used.

The modified form of drip valve illustrated in Fig. 5 operates exactly the same as the valve 10. The only difference is in the arrangement of the outlet openings. It includes a casing 10a having a large hot water inlet opening 11b, a large hot water outlet opening 12a and a small cold water inlet opening 15a. A piston 16b is slidably mounted within the casing 10a and adapted to alternately close openings 11b and 15a. The piston 16b is resiliently urged against the inlet opening 11b by a compression spring 17a.

The valve 10a may be used in place of valve 10 in any of the hook-ups illustrated in Figs. 2, 3, and 4. Of course some changes would be required to use valve 10a in the combination hot and cold water faucet shown in Fig. 4.

The scope of the invention is indicated in the appended claims.

I claim:

1. In combination, a valve comprising an elongated casing having an inlet opening in one end and an outlet opening in the other end of substantially the same size, the casing having a smaller auxiliary inlet opening formed in its side intermediate its opposite ends, a piston arranged within the casing to move longitudinally therein, the piston adapted to be moved to alternately close the large and small inlet openings, and a spring positioned within the casing, between the outlet end thereof and the piston to resiliently urge the piston to closed position with respect to the large inlet opening.

2. A fluid supply system including, in combination, a valve casing having large inlet and outlet openings and a small auxiliary inlet opening, a source of fluid supply, a supply pipe connected to the source of supply and the large inlet opening, a discharge pipe connected to the outlet opening of the valve casing, a shut-off valve associated with the discharge pipe, a second source of fluid supply, a supply pipe connecting the said second source of supply with the small auxiliary inlet opening, a piston within the casing adapted to be moved to alternately close the large and small inlet openings, and a spring positioned within the casing resiliently urging the piston to closed position with respect to the large inlet opening.

3. A fluid supply system including, in combination, a valve casing having large inlet and outlet openings and a small auxiliary inlet opening, a source of fluid supply, a supply pipe connected to the source of supply and the large inlet opening, a discharge pipe connected to the outlet opening of the valve casing, a shut-off valve associated with the discharge pipe, a second source of fluid supply, a supply pipe connecting the said second source of supply with the small auxiliary inlet opening, a piston within the casing adapted to be moved to alternately close the large and small inlet openings, and a spring positioned within the casing resiliently urging the piston to closed position with respect to the large inlet opening, the pressure exerted by the fluid at the large inlet opening being sufficient to overcome the resistance of the spring when the shut-off valve associated with the discharge pipe is opened and to move the piston to a position to close the small auxiliary inlet opening.

4. In combination, a valve comprising a casing having large and small inlet openings and a large outlet opening, means to supply fluid under pressure to the large and small inlet openings, an adjustable shut-off valve arranged exteriorly of the casing and associated with the outlet opening, a piston arranged within the casing adapted to be moved to alternately close the large and small inlet openings, and means disposed within the casing for resiliently holding the piston in closed position with respect to the large inlet opening only so long as the shut-off valve is substantially closed.

5. The combination with a water supply system including hot and cold water supply pipes provided with discharge faucets, of means to prevent leakage of hot water from the hot water supply faucet comprising a valve casing having large inlet and outlet openings connected to the hot water supply pipe whereby the hot water passes through the casing to reach the hot water faucet, the casing also having a smaller inlet opening connected to the cold water supply pipe, a piston disposed within the casing and adapted to be moved to alternately close the large and small inlet openings, and a spring arranged within the casing to resiliently urge the piston to closed position with respect to the large inlet opening, the strength of the spring being sufficient to hold the piston in such closed position when the hot water faucet is substantially closed and insufficient to hold it in such position when the hot water faucet is appreciably opened.

6. In combination, a valve casing having large and small inlet openings and a large outlet opening, means to supply fluid under pressure to the large and small inlet openings, an adjustable shut-off valve located outside the casing and associated with the outlet opening, and a piston within the casing arranged to close the large inlet opening only when the shut-off valve is closed and to close the small inlet opening only when the shut-off valve is appreciably opened.

GERALD E. WHITE.